No. 868,756. PATENTED OCT. 22, 1907.
J. B. BELL.
STOP COCK.
APPLICATION FILED JAN. 25, 1906.
Fig. 1.
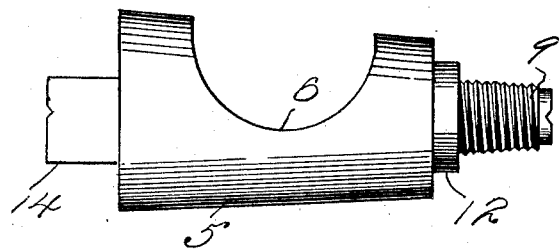
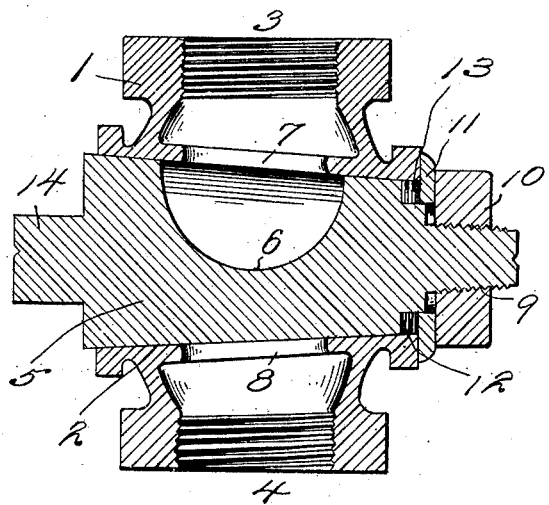
Fig. 2.
WITNESSES: INVENTOR
J. B. Bell
BY
ATTORNEYS

UNITED STATES PATENT OFFICE.

JOHN B. BELL, OF TAYLORSTOWN, PENNSYLVANIA.

STOP-COCK.

No. 868,756.  Specification of Letters Patent.  Patented Oct. 22, 1907.

Application filed January 25, 1906. Serial No. 297,851.

To all whom it may concern:

Be it known that I, JOHN B. BELL, a citizen of the United States, residing at Taylorstown, in the county of Washington, State of Pennsylvania, have invented certain new and useful Improvements in Stop-Cocks; and I do hereby declare the following to be a full, clear, and exact description of the invention, such as will enable others skilled in the art to which it appertains to make and use the same.
This invention relates to stop-cocks and has for its object to provide a simple, inexpensive, durable and efficient device of the character stated.

Heretofore, in devices of this nature, plugs have been used which are provided with a passageway formed directly through the plug and it has been found to be a fact that the steam pressure, when the plug is turned to close the valve, will exert sufficient force to cause some of the steam to pass around the plug and into the passage where it condenses and oftentimes freezes. To overcome this result, openings have been drilled in the plug casing, but this means a continual leakage regardless as to whether or not the valve is open or closed.

One of the main objects of my invention is therefore to provide a plug which is not provided with a continuous passage but which is cut away in one of its sides and, when the plug is closed, this cut-away portion is disposed directly facing the inlet opening of the valve casing and hence water of condensation will drain away from the cut-away portion and will not remain therein to be frozen.

A still further object of the invention is to provide a stop cock so constructed and arranged that freezing and bursting thereof is prevented and the pressure against the plug of the cock will hold the same in such manner as to prevent leakage.

In the drawings: Figure 1 is an elevation of the plug. Fig. 2 is a sectional view through the entire structure.

Referring now more particularly to the accompanying drawings, the reference character 1 indicates a shell provided with a tapering bore 2 which has communication with inlet and outlet connections 3 and 4 respectively. Fitted in the bore 2 is a plug 5 which tapers according to the taper of the bore and which is provided with a cavity 6 intermediate its ends for registration with the openings 7 and 8 between the inlet and outlet connections 3 and 4. The lower end of the plug 5 is reduced at 9 and screw-threaded exteriorly for engagement therewith of a nut 10 adapted to bear against the washer 11 therebetween and the lower end of the shell 1 to lock the plug 5 against accidental displacement. If desired, the lower end of the plug 5 above the reduced portion 9 may be provided with an annular cut away portion 12 about which may encircle a helical spring 13 designed to aid the plug 5 in performing the functions herein stated. The upper end of the plug 5 is reduced to form an angular head 14 for the engagement therewith of an operating lever (not shown). This angular head 14 is not arranged in the center of the top of the plug 5 but preferably off to one side thereof and toward the side opposite that in which the cavity 6 is formed the larger dimension of the plug surface adjacent the head 14 being in alinement with the cavity 6. By thus disposing, the angular head 14 with respect to the cavity 6, the disposition of the head and the lever (not shown) connected therewith, will disclose to the operator whether or not the cavity 6 is presented to the opening 7 or 8, and thereby enabling the manipulator to know whether or not the cock is open or closed.

It will be seen that when the pressure is exerting force against the back wall of the cavity 6 of the plug 5 that the plug will be forced tightly against the opposite wall and thereby positively cause a tight sealing between the plug and the opening 8.

What is claimed is:—

1. A stop cock comprising a shell provided with a tapering bore, and having inlet and outlet openings communicating with the bore, and a tapering plug fitted in the bore and provided with a cavity for alinement interchangeably with the inlet and outlet openings, the upper end of the plug above the shell being reduced to form an angular head off to one side of the top of the plug.

2. A valve comprising a casing, a plug rotatably mounted in the casing, and a head formed integral with one end of the plug and eccentrically thereon.

In testimony whereof, I affix my signature, in presence of two witnesses.

JOHN B. BELL.

Witnesses:
S. A. CROTHERS,
G. C. JOLLY.